J. H. W. ONION & W. H. H. LARDUSKEY.
Machines for Cutting Saw-Teeth.
No. 135,934. Patented Feb. 18, 1873.
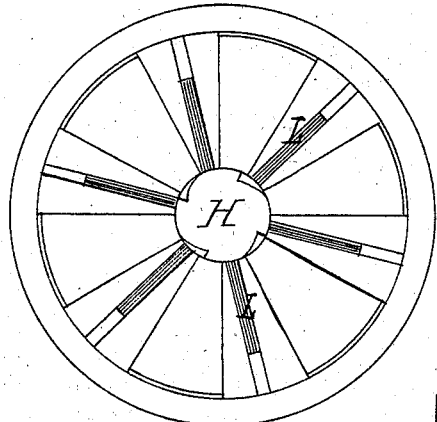
Fig. 2.
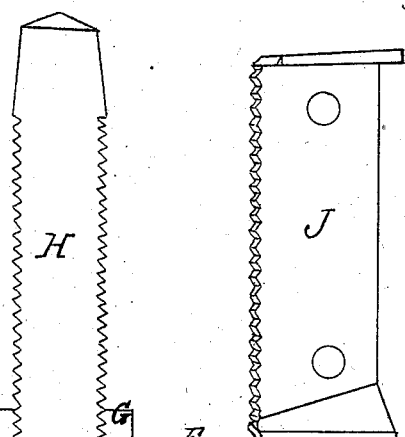
Fig. 1.
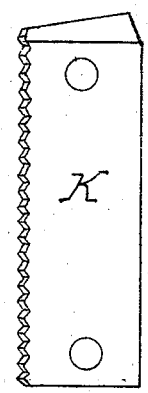
Fig. 3.
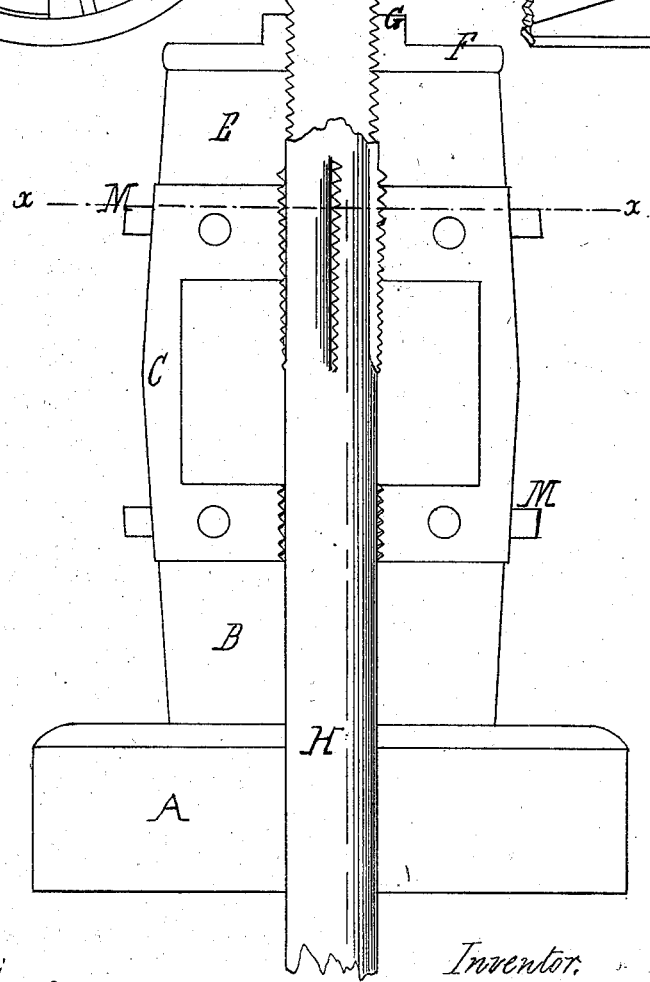

UNITED STATES PATENT OFFICE.

JAMES H. W. ONION AND WILLIAM H. H. LARDUSKEY, OF BALTIMORE, MARYLAND, ASSIGNORS OF ONE-THIRD OF THEIR RIGHT TO WILLIAM D. F. LARKIN, OF SAME PLACE.

IMPROVEMENT IN MACHINES FOR CUTTING SAW-TEETH.

Specification forming part of Letters Patent No. 135,934, dated February 18, 1873.

*To all whom it may concern:*

Be it known that we, JAMES H. W. ONION and WILLIAM H. H. LARDUSKEY, both of the city and county of Baltimore, in the State of Maryland, have invented a new and useful Improvement in Machines for Cutting Saw-Teeth; and we do hereby declare the following to be a full, clear, and exact description thereof, which will enable others skilled in the art to which it appertains to make and use the same, reference being had to the accompanying drawing which forms a part of this specification, and in which—

Figure 1 is a vertical axial section of our improvement; Fig. 2, a horizontal section thereof taken on the line $x$ $x$, Fig. 1; and Fig. 3, a detached perspective view of the separate parts of the clamp.

The same parts are denoted by the same letters in all the figures.

The object of this invention is to cut the teeth of a number of saws at once and as rapidly as possible; and this we accomplish by means of a revolving cylinder or shaft, provided with one or more series of cutting-teeth on its convex surface, and operating in combination with one or more holding devices, which hold one or more saw-blanks against the cutter.

A in the drawing represents the base or pedestal which supports the machine. B is the lower head, which may be made with a flange and bolted to the base, as shown, or secured thereto in any other convenient manner. C is the clamp-holder or body of the machine, which may be made in one piece with the heads B and E, or secured to them in any suitable way. To the upper head E is bolted a cap, F, constructed with a hub, G, on the inside of which is formed a female screw-thread. H is the tap or shaft, which constitutes the revolving cutter. On the upper part of H is a screw-thread fitting the female screw in G, as shown in the drawing, and below the screw-thread are one or more series of cutting-teeth.

The drawing represents the shaft as provided with four such series, but the number may be varied, as required, by the diameter of the shaft or other causes. The lower part of the shaft passes through the head B, which steadies it against lateral movement. The bore of the body C, or cylindrical hole about its axis, is wide enough to leave a little clearance for the cutting-teeth. One or more mortises of the general form of segments of a cylinder are made in the body C for the reception of the clamps which hold the saw-blanks. Each clamp is composed of two segments, J and K, shown in Fig. 3, the part J being made with flanges overlapping the part K, and the two united by screws or equivalent fastening devices. Between these segments are placed the saw-blanks L. The clamps are held in position by the rings M M, or by any other suitable means.

The operation of the machine is as follows: Any desired number of blanks (say twelve) having been placed within a clamp, and the segments J and K screwed up so as to hold the blanks tightly, the clamp is then inserted into its corresponding mortise, the rings M M forced over the body C so as to confine the clamps in position, and power applied to revolve the cutter-shaft. The lowest cutters of a series begin to cut the topmost teeth of the blanks, and are followed by the lowest cutters of the next series. As the shaft is fed downward by its rotation in the nut G, the lowest cutters advance, cutting new teeth in the blanks, while the cutters just above these enlarge the cuts previously made, and so the operation continues until the cutting portion of the shaft has traversed the length of the saw-blanks. The movement of the shaft is then reversed until it returns to its former position.

What we claim as our invention, and desire to secure by Letters Patent of the United States, is—

The combination, substantially as shown and described, of a revolving shaft provided with one or more series of cutting-teeth on its convex surface, and one or more clamps or equivalent devices, which hold the blanks against the cutters.

JAMES H. W. ONION.
WILLIAM HENRY HARISON LARDUSKEY.

Witnesses:
G. E. SANGSTON,
JAMES H. SUTER.